(12) United States Patent
Jo et al.

(10) Patent No.: US 11,756,300 B1
(45) Date of Patent: Sep. 12, 2023

(54) METHOD AND APPARATUS FOR SUMMARIZATION OF UNSUPERVISED VIDEO WITH EFFICIENT KEY FRAME SELECTION REWARD FUNCTIONS

(71) Applicant: INHA University Research and Business Foundation, Incheon (KR)

(72) Inventors: Geun Sik Jo, Incheon (KR); Ui Nyoung Yoon, Incheon (KR); Myung Duk Hong, Incheon (KR)

(73) Assignee: INHA UNIVERISTY RESEARCH AND BUSINESS FOUNDATION, Incheon (KR)

( * ) Notice: Subject to any disclaimer, the term of this patent is extended or adjusted under 35 U.S.C. 154(b) by 0 days.

(21) Appl. No.: 17/730,536

(22) Filed: Apr. 27, 2022

(51) Int. Cl.
*G06V 10/74* (2022.01)
*G06V 20/40* (2022.01)

(52) U.S. Cl.
CPC ............ *G06V 20/47* (2022.01); *G06V 10/761* (2022.01); *G06V 20/41* (2022.01)

(58) Field of Classification Search
CPC ....... G06V 20/47; G06V 10/761; G06V 20/41
USPC .......................................................... 386/241
See application file for complete search history.

(56) References Cited

U.S. PATENT DOCUMENTS

| | | | | |
|---|---|---|---|---|
| 8,599,316 B2* | 12/2013 | Deever | ................. | G06F 16/783 348/700 |
| 8,654,255 B2* | 2/2014 | Hua | .................... | H04N 21/4347 348/382 |
| 11,582,485 B1* | 2/2023 | Cherian | ................. | G06V 10/86 |
| 2022/0027633 A1* | 1/2022 | Jo | .......................... | G06N 3/045 |

(Continued)

OTHER PUBLICATIONS

Ejaz, N.; Mehmood, I.; Baik, S.W. Efficient visual attention based framework for extracting key frames from videos. J. Image Commun 2013, 28, 34-44.

(Continued)

*Primary Examiner* — Helen Shibru
(74) *Attorney, Agent, or Firm* — Hunter E. Webb; Keohane & D'Alessandro, PLLC

(57) ABSTRACT

Disclosed are a method and apparatus for summarization of unsupervised video with efficient key frame selection reward functions. Frame-level visual features are extracted from an input video. An attention weight is computed and an importance score is represented as a frame tracking probability for selecting a key frame using the attention weight. A temporal consistency reward function and a representativeness reward function are obtained so as to select the key frame, based on a visual similarity distance and temporal distance between key frames, and an attention-based video summarization network is trained to predict an importance score for selecting a key frame of a video summary by using the temporal consistency reward function and the representativeness reward function. A video summary is created by selecting a corresponding key frame based on the predicted importance score, the quality of the created video summary is evaluated, and policy gradient learning is performed for the attention-based video summarization network. Regularization and reconstruction loss is calculated for controlling the probability to select a key frame by using the importance score of the selected key frame. A video summary is created based on the calculated regularization and reconstruction loss.

8 Claims, 7 Drawing Sheets

(56) References Cited

U.S. PATENT DOCUMENTS

2022/0270370 A1* 8/2022 Perazzi .................. G06V 20/46
2022/0392218 A1* 12/2022 Hibino ................... G06F 16/54

OTHER PUBLICATIONS

Gygli, M.; Grabner, H.; Riemenschneider, H.; Gool, L.V. Creating summaries from user videos. In Proceedings of the European Conference on Computer Vision (ECCV)); Springer, 2015, pp. 505-520.

Koon, U,N.; Hong, M.D.; Jo, G.S. Interp-SUM: Unsupervised Video Summarization with Piecewise Linear Interpolation. Sensors 2021. vol. 21, No. 13, 4562.

Apostolidis, E.; Adamantidou, E.; Metsai, A.; Mezaris, V.; Patras, I. Unsupervised Video Summarization via Attention-Driven Adversarial Learning. In International Conference on Multimedia Modeling (MMM); Springer Daejeon, Korea, Jan. 5-8, 2020, pp. 492-504.

Jung, Y.J.; Cho, D.Y.; Kim, D.H.; Woo, S.H.; Kweon I.S. Discriminative feature learning for unsupervised video summarization. AAAI Conference on Artificial Intelligence, Honolulu, Hawaii, USA, Jan. 27-Feb. 1, 2019, pp. 8537-8544.

Zhou, K.; Qiao, Y.; Xiang, T. Deep Reinforcement Learning for Unsupervised Video Summarization with Diversity-Representativeness Reward AAAI Conf Artif Intell. 2018, 32, 7582-7589.

Song, Y.; Vallmitjana, J.; Stent, A.; Jaimes, A. Tvsum: Summarizing web videos using titles. In Proceedings of the IEEE Conference on Computer Vision and Pattern Recognition, Boston, MA, USA, Jun. 7-12, 2015, pp. 5179-5187.

Feng, L.; Li, Z.; Kuang, Z.; Zhang, W. Extractive Video Summarizer with Memory Augmented Neural Networks. MM, Seoul, Republic of Korea, Oct. 22-26, 2018, pp. 976-983.

Zhang, K.; Chao, W.L.; Sha, F.; Grauman, K. Video Summarization with Long Short-term Memory. In Proceedings of the European Conference on Computer Vision (ECCV); Springer: Amsterdam, Netherlands, 2016; pp. 766-782.

Zhang, Y.; Kampffmeyer, M.; Zhao, X.; Tan, M. DTR-GAN: Dilated Temporal Relational Adversarial Network for Video Summarization. In Proceedings of the ACM Turing Celebration Conference (ACM TURC), Shanghai, China, May 18, 2018.

Ji. Z.; Xiong. K.; Pang. Y.; Li. X. Video Summarization with Attention-Based Encoder-Decoder Networks. IEEE Transactions on circuits and systems for video technology, Jun. 2020, vol. 30, No. 6. pp. 1709-1717.

Mahasseni, B.; Lam, M.; Todorovic, S. Unsupervised Video Summarization with Adversarial LSTM Networks. In Proceedings of the IEEE Conference on Computer Vision and Pattern Recognition, Honolulu, Hawaii, USA, Jul. 22-25, 2017, pp. 202-211.

Yuan, L.; Tay, F.E.; Li, P.; Zhou, L.; Feng, F. Cycle-SUM: Cycle-consistent Adversarial LSTM Networks for Unsupervised Video Summarization. In Proceedings of the Thirty-Third AAAI Conference on Artificial Intelligence, Honolulu, Hawaii, USA, Jan. 27-Feb. 1, 2019, vol. 33, pp. 9143-9150.

Kaufman, D.; Levi, G.; Hassner, T.; Wolf, L. Temporal Tessellation: A Unified Approach for Video Analysis. In Proceedings of the IEEE International Conference on Computer Vision (ICCV), 2017, pp. 94-104.

Rochan, M.; Ye, L.; Wang, Y. Video Summarization Using Fully Convolutional Sequence Networks. In Proceedings of the European Conference on Computer Vision (ECCV); Springer: Munich, Germany, 2018, pp. 347-363.

Silver, D.; Lever, G.; Heess, N.; Degris, T.; Wierstra, D.; Riedmiller, M. Deterministic Policy Gradient Algorithms. In Proceedings of the 31st International Conference on International Conference on Machine Learning (ICML), Beijing, China, Jun. 21-26, 2014, pp. 387-395.

Yu, Y. Towards Sample Efficient Reinforcement Learning. In Proceedings of the Twenty-Seventh International Joint Conference on Artificial Intelligence (IJCAI), Stockholm, Sweden, Jul. 13-19, 2018, pp. 5739-5743.

Lehnert, L.; Laroche, R.; Seijen, H.V. On Value Function Representation of Long Horizon Problems. In Proceedings of the Thirty-Second AAAI Conference on Artificial Intelligence, New Orleans, Louisiana, USA, Feb. 2-7, 2018, pp. 3457-3465.

Szegedy, C.; Liu, W.; Jia, Y.; Sermanet, P.; Reed, S.; Anguelov, D.; Erhan, D.; Vanhoucke, B.; Rabinovich, A. Going deeper with convolutions. In Proceedings of the IEEE Conference on Computer Vision and Pattern Recognition (CVPR), Boston, MA, USA, Jun. 7-12, 2015, pp. 1-9.

Luong. T.; Pham. H.; Manning C.U.; Effective Approaches to Attention-based Neural Machine Translation. Proceedings of the 2015 Conference on Empirical Methods in Natural Language Processing (EMNLP), Lisbon, Portugal, Sep. 17-21, 2015, pp. 1412-1421. [21] Nachum, O.; Norouzi, M.; Schuurmans, D. Improving Policy Gradient by Exploring Under-Appreciated Rewards. arXiv 2016, arXiv:1611.09321.

Nachum, O.; Norouzi, M.; Schuurmans, D. Improving Policy Gradient by Exploring Under-Appreciated Rewards. arXiv 2016, arXiv:1611.09321.

Potapov, D.; Douze, M.; Harchaoui, Z.; Schmid, C.; Category-specific video summarization. European Conference on Computer Vision (ECCV), Zurich, Switzerland, Sep. 2014, pp. 540-555.

Rochan, M.; Wang, Y. Video Summarization by Learning from Unpaired Data. In Proceedings of the IEEE Conference on Computer Vision and Pattern Recognition (CVPR) 2019, pp. 7902-7911.

* cited by examiner

METHOD AND APPARATUS FOR SUMMARIZATION OF UNSUPERVISED VIDEO WITH EFFICIENT KEY FRAME SELECTION REWARD FUNCTIONS

CROSS-REFERENCES TO RELATED APPLICATION

This application is based on and claims priority under 35 U.S.C. 119 to Korean Patent Application No. 10-2022-0026671, filed on Feb. 3, 2022 in the Korean intellectual property office, the disclosures of which are herein incorporated by reference in its entirety.

TECHNICAL FIELD

The present disclosure relates to a method and apparatus for summarization of unsupervised video with efficient key frame selection reward functions.

BACKGROUND OF THE INVENTION

Many people spend their time browsing videos that interest them in online video sharing platforms like YouTube® (YouTube is a Trademark of Google, LLC, in the U.S. and elsewhere). As a way to save them time browsing, people usually use a preview or a short video summary to get an efficient and quick grasp of the entire video content [1]. Since video summarization has been important over the past few years, active research is being conducted to browse video content and/or to make a short summary video out of a long video. One problem with the task of video summarization is that can be challenging to predict frame-level or shot-level importance scores of videos [2]. This is because video summarization is generally an abstract and subjective multi-mode task that has no explicit audiovisual pattern or semantic rules. If one finds a frame of a video interesting and useful, the importance score of that frame should usually be high. Such frames with high scores can be selected to create a video summary.

Various methods have been proposed recently, and these methods show high performance using deep learning [3], [4], and [5]. Deep learning-based video summarization methods are divided into supervised learning-based methods and unsupervised learning-based methods. In the case of the supervised learning-based methods, it is often quite difficult to create a labeled dataset. It is also generally quite difficult to create a large dataset that encompasses various domains or scenes. For this reason, more focus has recently been put on the development of unsupervised video summarization methods.

A reinforcement learning (RL)-based video summarization method was proposed in the conventional technology [6] and has shown good results. Notably, there is an efficient and explicit evaluation method for selecting a key frame, which is a reward function, to train a deep neural network using RL. Also, the deep neural network efficiently learns various features of videos, such as representativeness, diversity, and integrity, using an evaluation method. Using RL, the conventional technology [3] uses piecewise linear interpolation proposed Intern-SUM. The use of interpolation reduced network output helps to alleviate the high distribution problem and improves performance. However, in some, case key frames were selected only from a particular scene in many videos, or interesting key frames were seldom selected.

Moreover, there are a few drawbacks with the existing RL-based video summarization methods. First, it is often difficult to capture visual and temporal context with a deep neural network. Second, many of these methods do not allow for temporal distribution of key frames but use a reward function or loss function in order to train a network by calculating visual differences between key frames. Therefore, there is a need for a video summarization method that conveys a producer's storyline by selecting a key frame in a way that makes it easy to understand a video.

SUMMARY

An aspect of the present disclosure proposes a reinforcement learning-based video summarization framework with new temporal consistency reward and representativeness reward functions (TR-SUM) and an attention-based video summarization method and apparatus for precisely predicting importance scores. More specifically, an aspect of the present disclosure provides a video summarization network having an attention-based encoder-decoder architecture that efficiently captures the context of a long video and new reward functions, which are a temporal consistency reward function and a representativeness reward function, for efficiently and uniformly selecting a key frame of interest.

In one aspect, an unsupervised video summarization method with an efficient key frame selection reward function according to the present disclosure includes: extracting frame-level visual features from an input video; computing an attention weight and representing an importance score as a frame tracking probability for selecting a key frame by using the attention weight; obtaining a temporal consistency reward function and a representativeness reward function so as to select the key frame, based on a visual similarity distance and temporal distance between key frames, and training an attention-based video summarization network to predict an importance score for selecting a key frame of a video summary by using the temporal consistency reward function and the representativeness reward function; creating a video summary by selecting a corresponding key frame based on the predicted importance score, evaluating the quality of the created video summary, and performing policy gradient learning for the attention-based video summarization network; calculating regularization and reconstruction loss for controlling the probability to select a key frame by using the importance score of the selected key frame; and creating a video summary based on the calculated regularization and reconstruction loss.

In the step of computing the attention weight and representing the importance score as a frame tracking probability for selecting a key frame by using the attention weight, the step being performed using an encoder network, a decoder network, and an attention layer between the encoder network and the decoder network reduce parameters and calculations through dilated RNN and extract temporal dependency, wherein the encoder network captures visual similarities with local and global context between key frames, wherein the attention layer computes an attention weight by using both the output of the encoder network and the last hidden state of the decoder network, wherein the attention weight is normalized to a probability score of each key frame by a softmax function, wherein a context vector is obtained by multiplying the output of the encoder network by the attention weight, and wherein the decoder network is trained by connecting the context vector and the previous output of an initialized decoder network for the input of the decoder network, to obtain an importance score by using learning results of the decoder network and the encoder network.

In the step of obtaining the temporal consistency reward function and the representativeness reward function so as to select the key frame, based on a visual similarity distance and temporal distance between key frames, and trains an attention-based video summarization network to predict an importance score for selecting a key frame of a video summary by using the temporal consistency reward function and the representativeness reward function, the step further includes calculating the similarity between the selected key frame and all key frames of the video is calculated by using features extracted using the representative reward function and predicting an importance score for selecting a key frame of a video summary through the representative reward function, and repeating the process of finding the closest neighbor among the selected key frames with respect to all the key frames, in order to select a representative shot-level key frame using the temporal consistency reward function.

In the step of creating a video summary by selecting the corresponding key frame based on the predicted importance score, evaluating the quality of the created video summary, and performing policy gradient learning for the attention-based video summarization network, the step further includes performing parameterized policy gradient learning by computing a set of normalized importance weights for each episode by using an objective function of an exploration strategy for exploring an under-appreciated reward (UREX) method and a softmax function for approximation of the objective function.

In another aspect, an attention-based video summarization apparatus according to the present disclosure includes: a processor; and a memory coupled to the processor, the memory containing instructions, that when executed by the processor: extracts frame-level visual features from an input video; computes an attention weight through an attention-based video summarization network and represents an importance score as a frame tracking probability for selecting a key frame by using the attention weight; obtains a temporal consistency reward function and a representativeness reward function so as to select the key frame, based on a visual similarity distance and temporal distance between key frames, and trains an attention-based video summarization network to predict an importance score for selecting a key frame of a video summary by using the temporal consistency reward function and the representativeness reward function; creates a video summary by selecting a corresponding key frame based on the predicted importance score, evaluates the quality of the created video summary, and performs policy gradient learning for the attention-based video summarization network, wherein the video summarization network module calculates regularization and reconstruction loss for controlling the probability to select a key frame by using the importance score of the selected key frame; and creates a video summary based on the calculated regularization and reconstruction loss.

According to embodiments of the present disclosure, there are proposed a reinforcement learning-based video summarization framework with new temporal consistency reward and representativeness reward functions (TR-SUM) and an attention-based video summarization method and apparatus for precisely predicting importance scores. The proposed unsupervised video summarization method may efficiently capture the context of a long video through a video summarization network having an attention-based encoder-decoder architecture and may efficiently and uniformly select a key frame of interest using new reward functions which are a temporal consistency reward function and a representativeness reward function.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The present disclosure proposes an unsupervised video summarization method with an efficient key frame selection reward function. A reinforcement learning-based video summarization framework with new temporal consistency reward and representativeness reward functions (TR-SUM) is designed for efficient key frame selection. A video summarization method and apparatus with an attention-based encoder-decoder architecture is proposed to predict key frame-level importance scores of a video. According to an embodiment of the present disclosure, rewards are calculated based on a reward function that helps efficiently and uniformly select a key frame of interest using importance scores.

Figure 1:
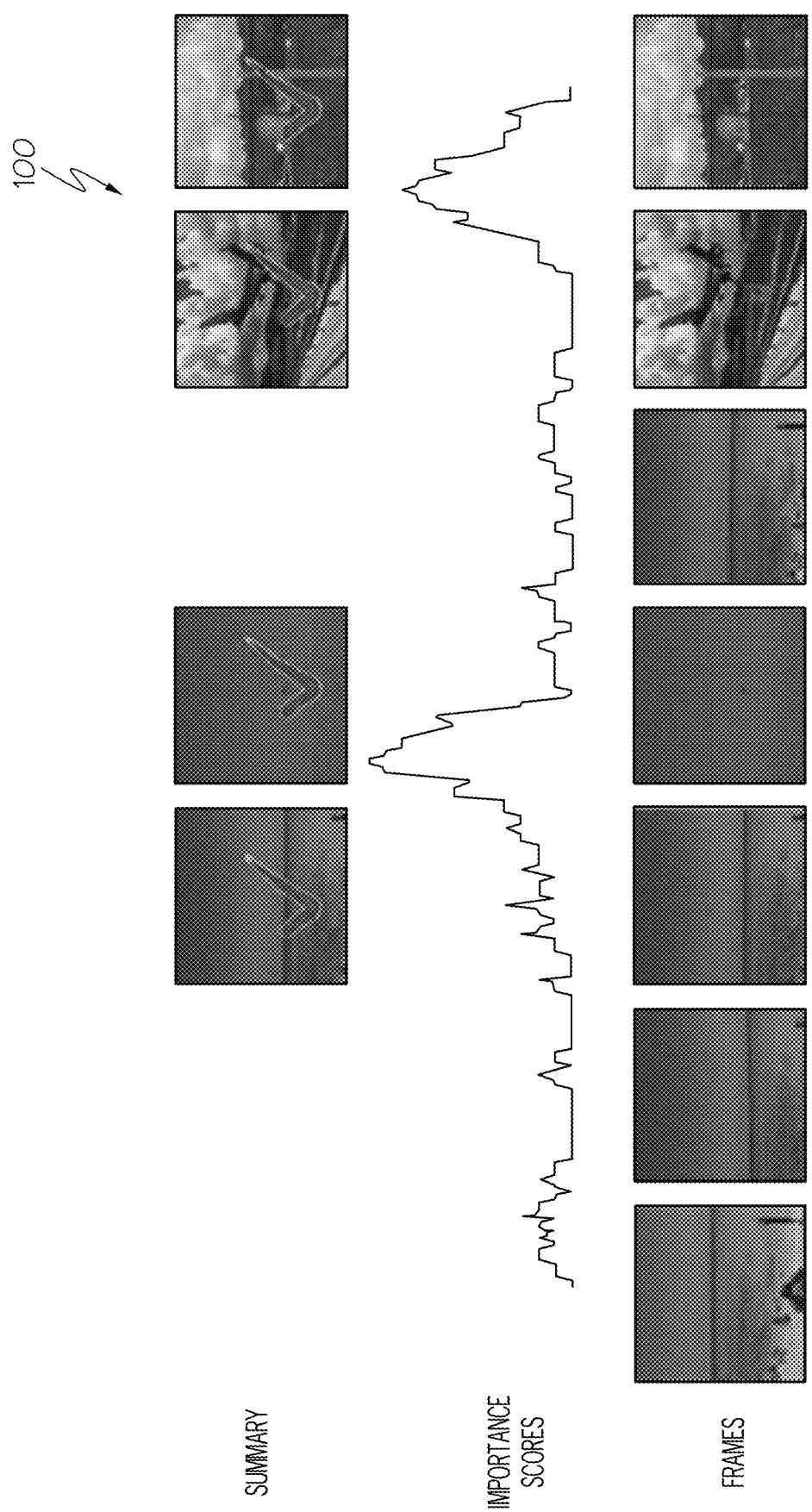
FIG. 1 is a view for explaining the concept of an attention-based video summarization network according to an embodiment of the present disclosure.

FIG. 1 is a view 100 for explaining the concept of an attention-based video summarization network according to an embodiment of the present disclosure.

The present disclosure proposes a reinforcement learning-based video summarization framework with new temporal consistency reward and representativeness reward functions (TR-SUM) and proposes an attention-based video summarization network for precisely predicting importance scores as in FIG. 1.

The proposed unsupervised video summarization method allows efficient capturing of the context of a long video through a video summarization network having an attention-based encoder-decoder architecture, and also allows efficient and uniform selection of a key frame of interest using novel reward functions which are a temporal consistency reward function and a representativeness reward function.

The video summarization method is divided into a supervised learning-based method and an unsupervised learning-based method. Both of the two methods use a video summarization dataset including frame-level or shot-level importance scores of a video annotated by multiple users [2]. In the supervised learning-based method, a model is trained by using frame-level or shot-level features of a video as input for predicting importance scores. In this method, a cost is calculated by the difference between an importance score predicted using a dataset and an annotated importance score. Also, this method minimizes cost for finding an optimum model.

The conventional technology [8] proposes a memory augmented video summarization method. A memory network efficiently provides supporting knowledge extracted from an entire video. To predict the importance score of a current shot, the score is adjusted by an overall understanding of the original video by using a global attention mechanism. The conventional technology [9] proposes an LSTM-based network with a determinantal point process (DPP) for encoding the probability to sample a frame for learning representativeness and diversity. The conventional technology [10] proposes a dilated temporal relational (DTR) unit of a generator for reinforcing temporal context representations among video frames. To train a network for predicting the best summary of a video, an adversarial learning method is used together with a three-player loss function. The conventional technology [11] proposes an attention-based encoder-decoder network to predict importance scores for key shot selection. This network learns video representations by using an encoder with a bidirectional LSTM network and a decoder with an attention mechanism.

However, one problem with the supervised learning-based method is that it is very difficult to make a human-labeled video summarization dataset, including videos of various domains.

In the conventional technology [4], an attention autoencoder (AAE) network replaces a variational autoencoder (VAE) in SUM-GAN in order to improve the efficiency and performance of an adversarial autoencoder (AAE) proposed in SUM-GAN. The network gives a weight to an interesting frame for summarizing video during training. The conventional technology [5] proposes a chunk and stride network (CSNet) based on a VAE and GAN (Generative Adversarial Networks) architecture. The conventional technology [12] proposes an adversarial autoencoder (AAE)-based video summarization model. A selector LSTM selects frames from input frame level features of a video. Next, the VAE generates a reconstructed video using the selected frames. A discriminator distinguishes between the reconstructed video and the original input video to train the entire network. For training the model, four different loss functions are used. The conventional technology [13] proposes Cycle-SUM which is a variant of SUM-GAN but adopts a cycle generative adversarial network with two VAE-based generators and two discriminators in order to preserve the information of the original video in the summary video. A video summarization method proposed in the conventional technology [14] that uses a Tessellation approach selects a clip that maintains temporal consistency by finding a visually similar clip and using a Viterbi algorithm which is a graph-based method. The conventional technology [15] proposes an unsupervised learning-based SUM-FCN. This method proposes a new FCN architecture with temporal convolution converted from spatial convolution in order to process a video sequence. In this method, frames are selected using the output score of the decoder, and the loss function is calculated with a repelling regularizer to apply the diversity of frames in a summary video.

Deep reinforcement learning combines a deep neural network with a reinforcement learning method [16]. A policy gradient method is one of reinforcement learning methods with no model. The policy gradient method parameterizes a policy in a deep neural network model and optimizes the model by maximizing rewards for a state distribution defined by the policy using a gradient descent method such as stochastic gradient descent (SGD). To train the model, this method calculates and minimizes cost by an objective function. However, the policy gradient method has several problems, such as the low sample efficiency problem [17] and the high distribution problem. Especially in the case of the low sample efficiency problem, the agent requires many more samples, such as human experiences, for learning actions in the environment (states), than humans because it is not as intelligent as humans. Another problem is the high variance of the estimated gradient. This problem is caused by the high dimensional action space and long-horizon problem [18], which means a hugely delayed reward for a long sequence of decisions to find a goal. In the proposed method, a policy gradient is used along with the baseline to reduce variance, and the number of episodes is increased to improve the sample efficiency problem.

Figure 2:
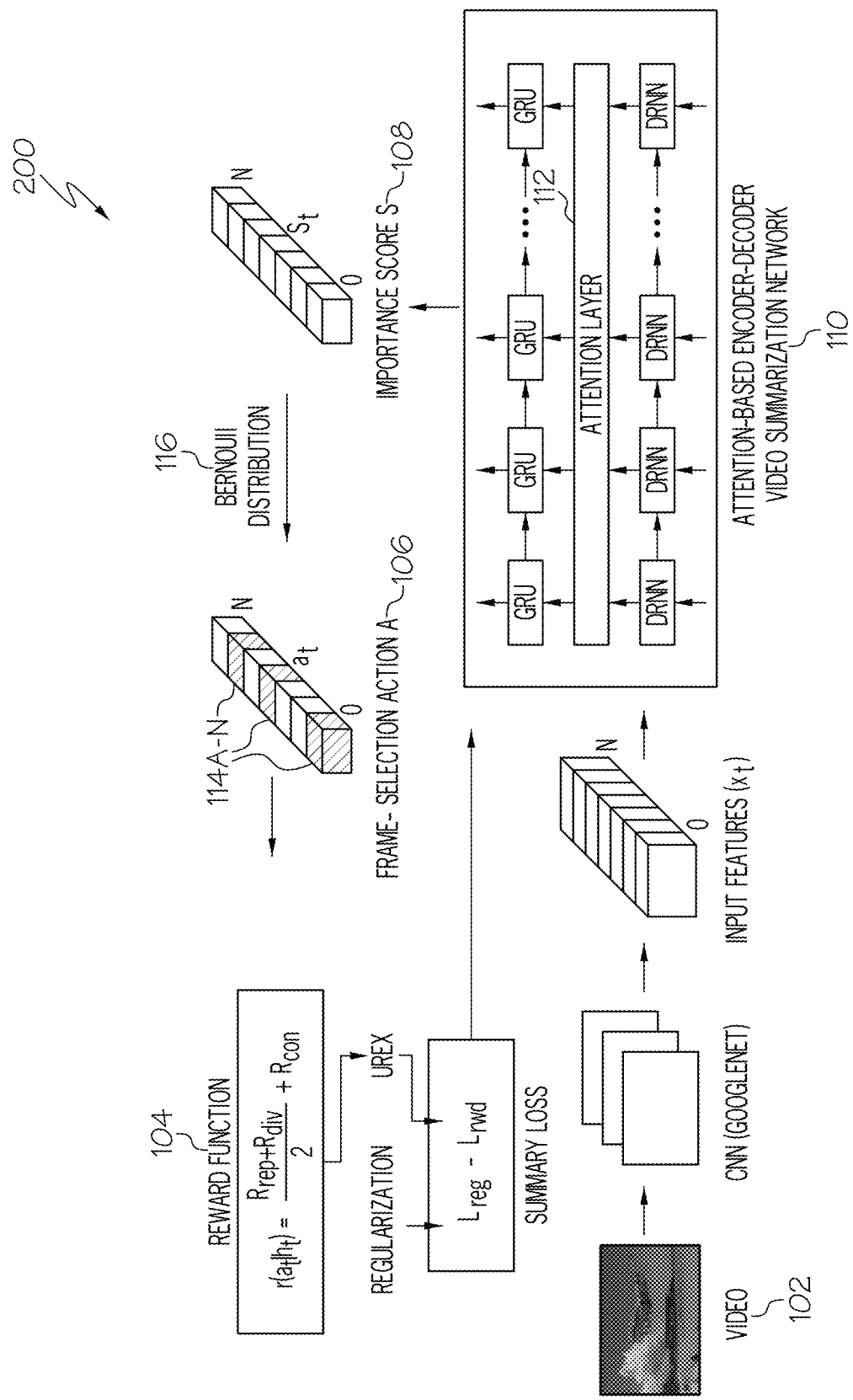
FIG. 2 is a view showing a reinforcement learning-based video summarization framework using temporal consistency reward and representativeness reward functions according to an embodiment of the present disclosure.

FIG. 2 is a view 200 showing a reinforcement learning-based video 102 summarization framework using temporal consistency reward and representativeness reward functions 104 according to an embodiment of the present disclosure.

In the present disclosure, the video summarization problem is formulated as a frame selection problem 106 by using importance scores 108 predicted by a video summarization network. In particular, a network is developed by using a dilated GRU encoder and a GRU decoder network 110 with an attention mechanism 112. This network learns video 102 representations and efficiently predicts importance scores 108 by frame-selection probability. The importance scores 108 are converted into frame-selection actions 106 to select key frames 114A-N as a summary by using Bernoulli distribution 116, as shown in FIG. 2.

Figure 3:
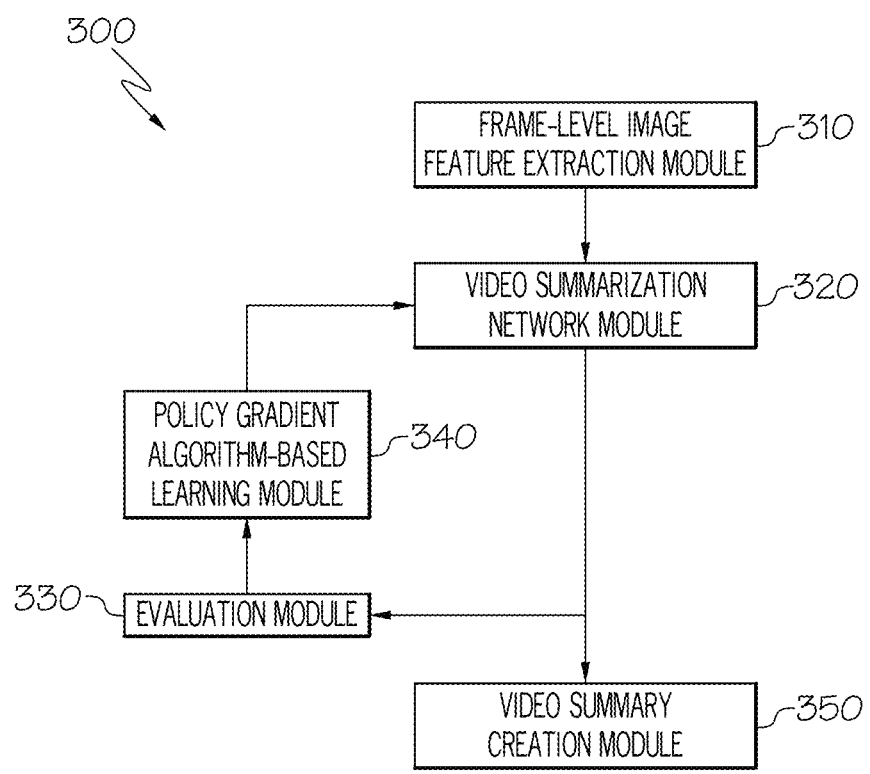
FIG. 3 is a view showing a construction of an unsupervised video summarization apparatus with an efficient key frame selection reward function according to an embodiment of the present disclosure.

FIG. 3 is a view showing a construction of an unsupervised video summarization apparatus with an efficient key frame selection reward function according to an embodiment of the present disclosure.

The proposed unsupervised video summarization apparatus with an efficient key frame selection reward function includes a frame-level image feature extraction module 310, a video summarization network module 320, an evaluation module 330, a policy gradient algorithm-based learning module 340, and a video summary creation module 350.

The frame-level image feature extraction module 310 according to the embodiment of the present disclosure extracts frame-level visual features from an input video, and the attention-based video summarization network module 320 computes an attention weight and represents an importance score as a frame tracking probability for selecting a key frame by using the attention weight.

In the video summarization network module 320 according to the embodiment of the present disclosure, an encoder network, a decoder network, and an attention layer between the encoder network and the decoder network reduce parameters and calculations through dilated RNN and extract temporal dependency.

In the video summarization network module 320 according to the embodiment of the present disclosure, the encoder network captures visual similarities with local and global context between key frames, and the attention layer computes an attention weight by using both the output of the encoder network and the last hidden state of the decoder network. The video summarization network module 320 according to the embodiment of the present disclosure normalizes the attention weight to a probability score of each key frame by a softmax function and obtains a context vector by multiplying the output of the encoder network by the attention weight.

The video summarization network module 320 according to the embodiment of the present disclosure trains the decoder network by connecting the context vector and the previous output of an initialized decoder network for the input of the decoder network, to obtain an importance score by using learning results of the decoder network and the encoder network.

The evaluation module 330 according to the embodiment of the present disclosure obtains a temporal consistency reward function and a representativeness reward function so as to select the key frame, based on a visual similarity distance and temporal distance between key frames, and trains the attention-based video summarization network to predict an importance score for selecting a key frame of a video summary by using the temporal consistency reward function and the representativeness reward function.

The evaluation module 330 according to the embodiment of the present disclosure is trained to calculate the similarity between the selected key frame and all key frames of the video by using features extracted using the representative reward function and predict an importance score for selecting a key frame of a video summary through the representative reward function.

The evaluation module 330 according to the embodiment of the present disclosure is trained to repeat the process of finding the closest neighbor among the selected key frames with respect to all the key frames, in order to select a representative shot-level key frame using the temporal consistency reward function.

The policy gradient algorithm-based learning module 340 according to the embodiment of the present disclosure creates a video summary by selecting a corresponding key frame based on the predicted importance score, evaluates the quality of the created video summary, and performs policy gradient learning for the attention-based video summarization network.

The policy gradient algorithm-based learning module 340 according to the embodiment of the present disclosure performs parameterized policy gradient learning by computing a set of normalized importance weights for each episode by using an objective function of an exploration strategy for exploring an under-appreciated reward (UREX) method and a softmax function for approximation of the objective function.

The video summarization network module 320 according to the embodiment of the present disclosure calculates regularization and reconstruction loss for controlling the probability to select a key frame by using the importance score of the selected key frame. The video summary creation module 350 according to the embodiment of the present disclosure creates a video summary based on the calculated regularization and reconstruction loss.

Figure 4:
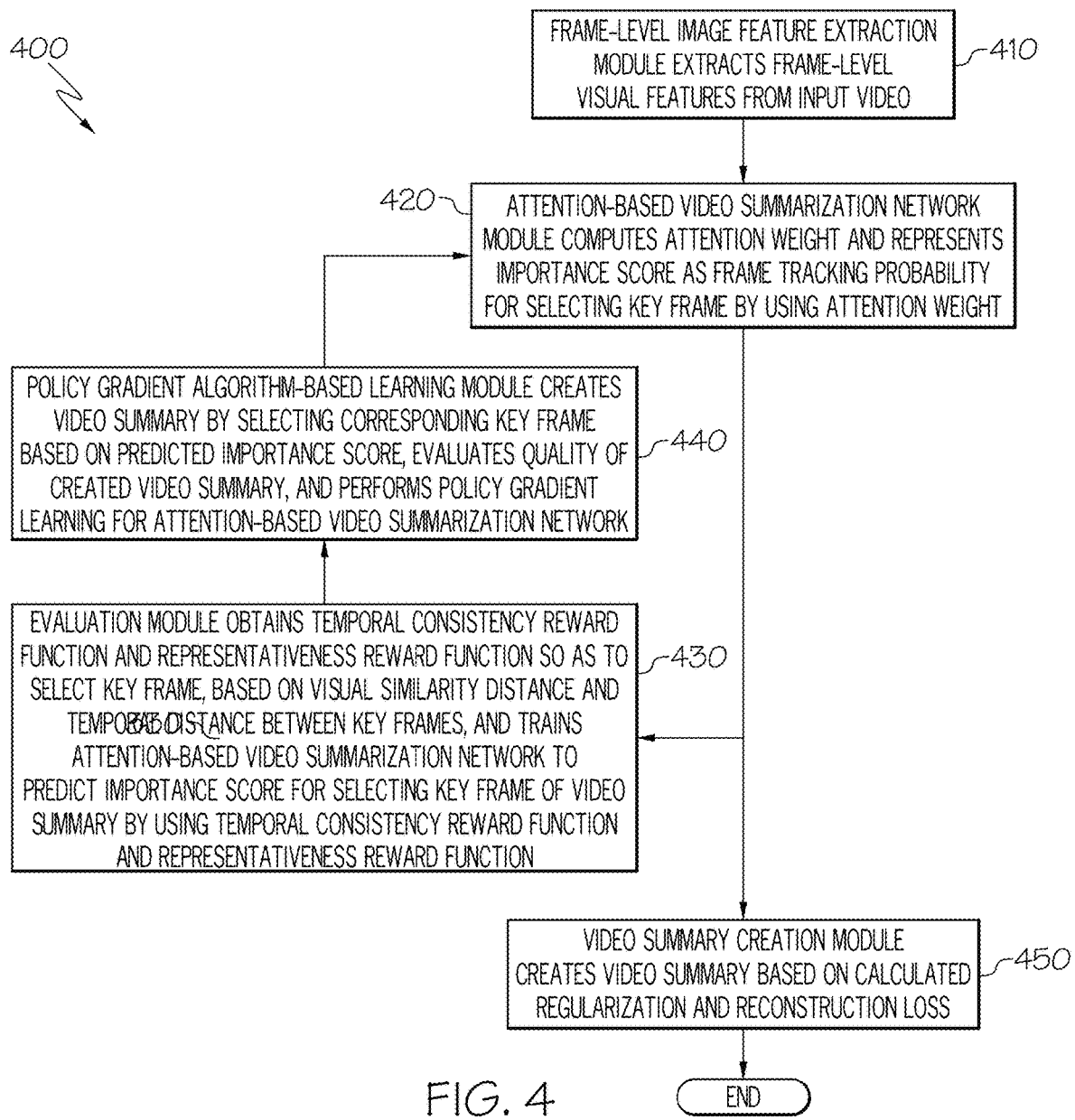
FIG. 4 is a flowchart for explaining an unsupervised video summary method with an efficient key frame selection reward function according to an embodiment of the present disclosure.

FIG. 4 is a flowchart 400 for explaining an unsupervised video summary method with an efficient key frame selection reward function according to an embodiment of the present disclosure.

The proposed unsupervised video summary method with an efficient key frame selection reward function includes: the step 410 in which a frame-level image feature extraction module extracts frame-level visual features from an input video; the step 420 in which an attention-based video summarization network module computes an attention weight and represents an importance score as a frame tracking probability for selecting a key frame by using the attention weight; the step 430 in which an evaluation module obtains a temporal consistency reward function and a representativeness reward function so as to select the key frame, based on a visual similarity distance and temporal distance between key frames, and trains an attention-based video summarization network to predict an importance score for selecting a key frame of a video summary by using the temporal consistency reward function and the representativeness reward function; the step 440 in which a policy gradient algorithm-based learning module creates a video summary by selecting a corresponding key frame based on the predicted importance score, evaluates the quality of the created video summary, and performs policy gradient learning for the attention-based video summarization network; the step 420 in which the video summarization network module calculates regularization and reconstruction loss for controlling the probability to select a key frame by using the importance score of the selected key frame; and the step 450 in which a video summary creation module creates a video summary based on the calculated regularization and reconstruction loss.

In step 410, the frame-level image feature extraction module extracts frame-level visual features from an input video.

In step 420, the attention-based video summarization network module computes an attention weight and represents an importance score as a frame tracking probability for selecting a key frame by using the attention weight.

According to the embodiment of the present disclosure, an encoder network, a decoder network, and an attention layer between the encoder network and the decoder network reduce parameters and calculations through dilated RNN and extract temporal dependency.

The encoder network captures visual similarities with local and global context between key frames, and the attention layer computes an attention weight by using both the output of the encoder network and the last hidden state of the decoder network.

The attention weight is normalized to a probability score of each key frame by a softmax function, and a context vector is obtained by multiplying the output of the encoder network by the attention weight.

The decoder network is trained by connecting the context vector and the previous output of an initialized decoder network for the input of the decoder network, to obtain an importance score by using learning results of the decoder network and the encoder network.

In step 430, the evaluation module obtains a temporal consistency reward function and a representativeness reward function so as to select the key frame, based on a visual similarity distance and temporal distance between key frames, and trains the attention-based video summarization network to predict an importance score for selecting a key frame of a video summary by using the temporal consistency reward function and the representativeness reward function.

The evaluation module is trained to calculate the similarity between the selected key frame and all key frames of the video is calculated by using features extracted using the representative reward function and predict an importance score for selecting a key frame of a video summary through the representative reward function.

The evaluation module is trained to repeat the process of finding the closest neighbor among the selected key frames with respect to all the key frames, in order to select a representative shot-level key frame using the temporal consistency reward function.

In step 440, the policy gradient algorithm-based learning module creates a video summary by selecting a corresponding key frame based on the predicted importance score, evaluates the quality of the created video summary, and performs policy gradient learning for the attention-based video summarization network.

According to the embodiment of the present disclosure, the policy gradient algorithm-based learning module performs parameterized policy gradient learning by computing a set of normalized importance weights for each episode by using an objective function of an exploration strategy for exploring an under-appreciated reward (UREX) method and a softmax function for approximation of the objective function.

Back in step 420, the video summarization network module calculates regularization and reconstruction loss for controlling the probability to select a key frame by using the importance score of the selected key frame. In step 450, the video summary creation module creates a video summary based on the calculated regularization and reconstruction loss. The proposed unsupervised video summarization method with an efficient key frame selection reward function will be described in more detail with reference to FIGS. 5 to 7.

Figure 5:
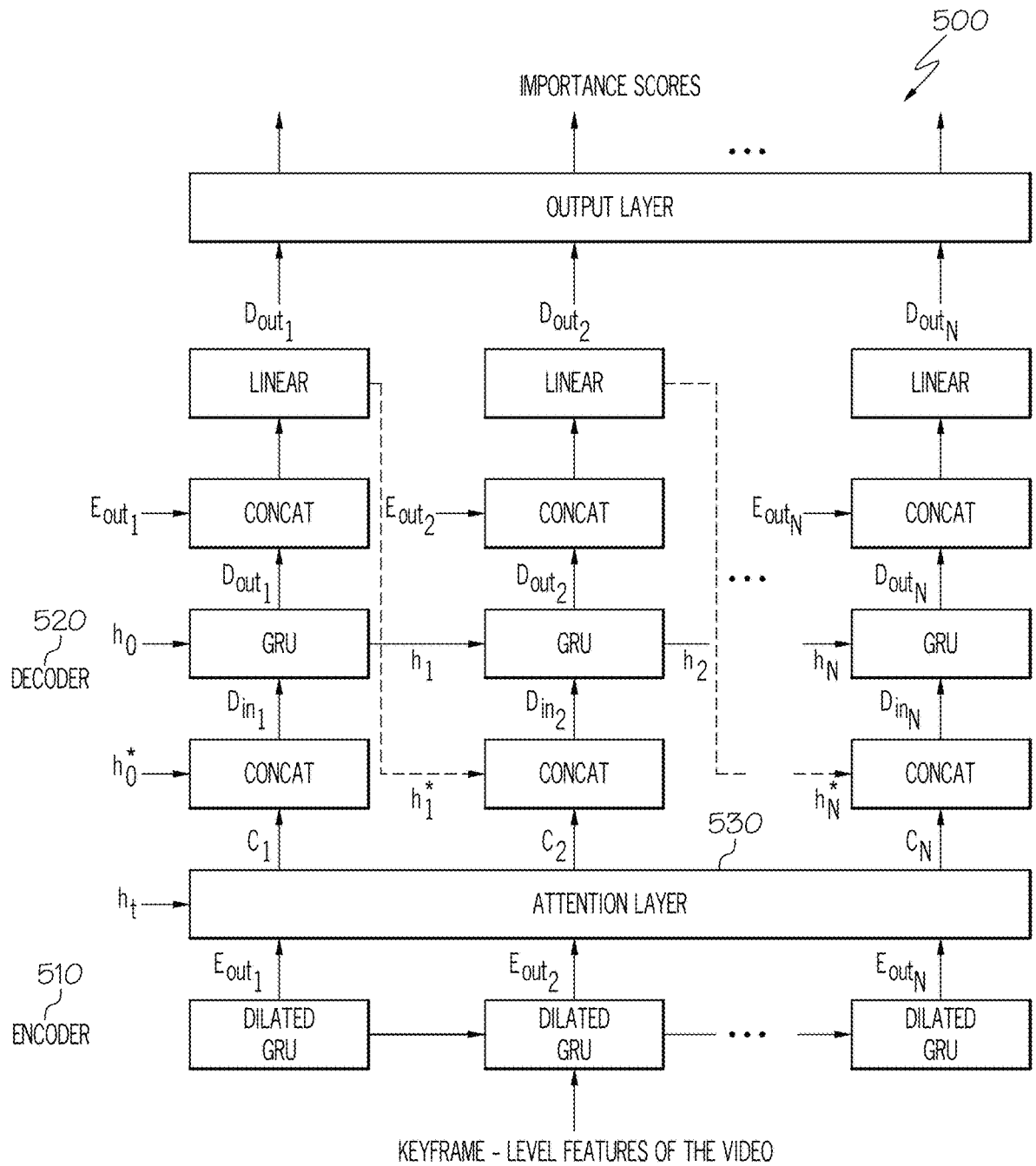
FIG. 5 is a view illustrating a configuration of an attention-based video summarization network for computing an attention weight according to an embodiment of the present disclosure.

FIG. 5 is a view 500 illustrating a configuration of an attention-based video summarization network for computing an attention weight according to an embodiment of the present disclosure.

First, extract visual features $\{x_t\}_{t=1}^N$ are extracted from an input video using GoogleNet [19], which is a deep convolutional neural network trained with an ImageNet dataset. Feature extraction is needed to capture visual features of frame images with a low-dimensional feature vector. The extracted features help efficiently calculate the visual differences among the frames in the video.

The present disclosure proposes an attention-based video summarization network for predicting a key frame-level importance score, as shown in FIG. 5. The attention-based video summarization network includes an encoder network 510, a decoder network 520, and an attention layer 530 between the two networks. This network improves an attention autoencoder by replacing an LSTM network with a dilated RNN by the attention autoencoder [4] proposed with respect to a SUM-GANAAE method and replacing a GRU (gate recurrent unit) network with a decoder. The dilated RNN is implemented together with a dilated skip connection in order to improve computational efficiency with less parameters. In particular, the network extracts temporal dependency by stacking dilated recurrent layers and exponentially increasing dilations across all the layers. Also, GRU cells are used as the layers of the dilated RNN. The encoder network captures visual similarities with local and global context between key frames, and the attention layer computes an attention weight by using both the output of the encoder network and the last hidden state of the decoder network. To compute the attention weight, the attention mechanism proposed in [20] is used. In particular, as explained in Equation (1), a content-based score function is used to calculate the attention weight by using the output of the encoder network Eout and the last hidden state of the decoder network ht−1. For t=1, the output of the decoder network h is set to 0. Wα is attention weight matrix which are parameters that can be learned:

$$\text{Score}(E_{out}, h_{t-1}) = E_{out}^T W_\alpha h_{t-1} \quad \text{Equation (1)}$$

Next, the attention weight is normalized to a probability score of each key frame by a softmax function, and a context vector C is obtained by multiplying the output of the encoder network by the attention weight.

The context vector and the previous output of the decoder network initialized to 0 are connected for the input of the decoder network $D_{in}$. Also, the decoder network is trained. Then, the next output $D_{out}$ is obtained and connected to $E_{out}$ to reuse rich information on which the encoder network is trained, thereby improving performance for a long-sequence video. Also, the dimension of a feature size to be transmitted to the decoder network in the next step t+1, along with a linear function, is reduced. Lastly, by using a fully connected layer and a sigmoid function, the dimension of the output is reduced, and an output is produced using the importance score $S=\{S_t\}_{t=1}^N$. That is, the importance score is a frame tracking probability (0. to 1.) for selecting a key frame as a video summary.

Figure 6:
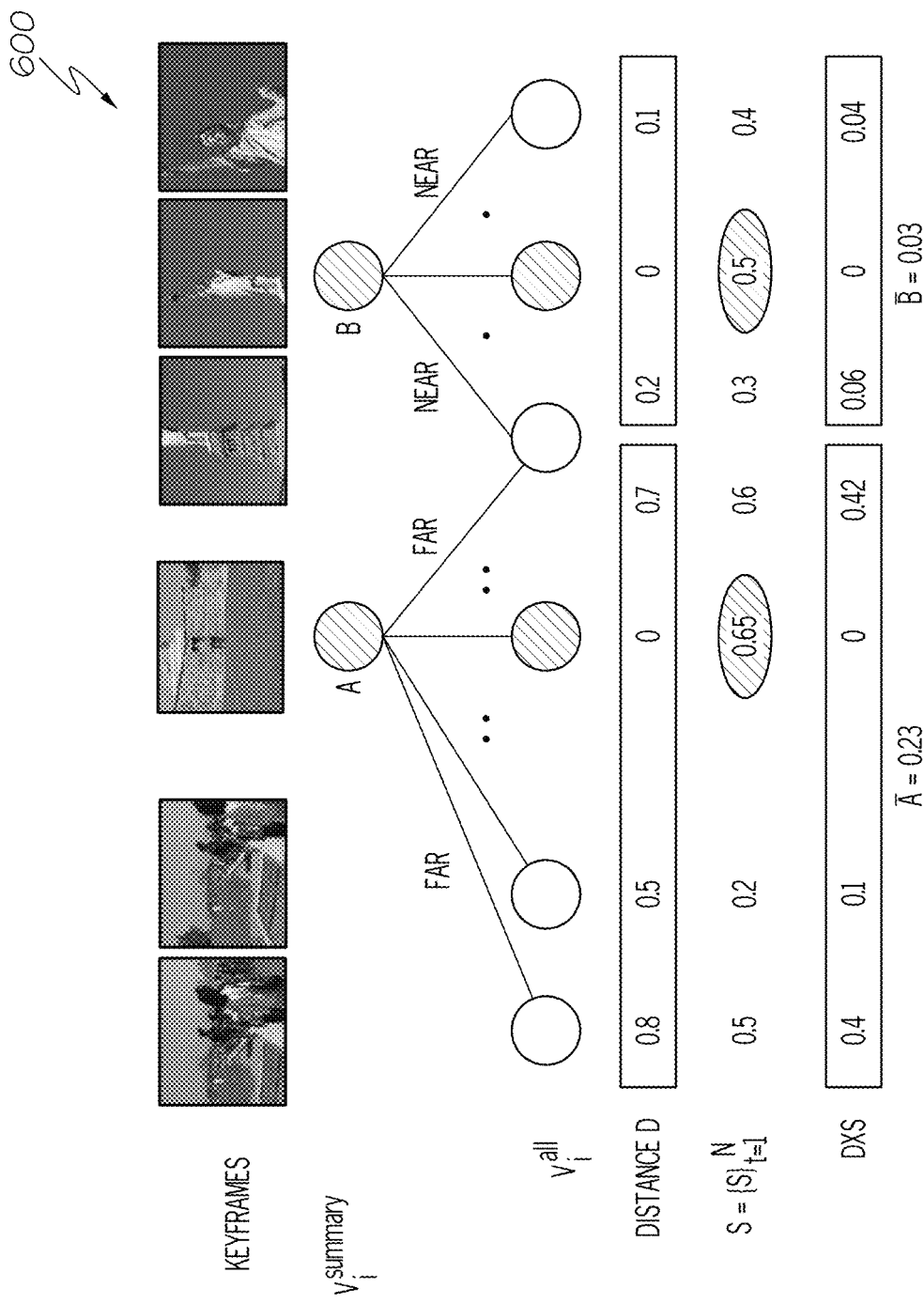
FIG. 6 is a view for explaining a representativeness reward function according to an embodiment of the present disclosure.

FIG. 6 is a view 600 for explaining a representativeness reward function according to an embodiment of the present disclosure.

For efficient video summarization according to the embodiment of the present disclosure, a diversity reward function in the conventional technology [6] is adopted, and two new rewards are proposed for efficient key frame selection. The proposed reward functions are a temporal consistency reward function and a representativeness reward function, which allow for a visual similarity distance and temporal distance between key frames.

The diversity reward function $R_{div}$ Equation (2) calculates differences between key frames selected by a frame select action, along with extracted features. Through this reward function, the network is trained to predict an importance score for selecting diverse frames as key frames of a summary. Also, the summary consisting of such key frames allows easy grasping of what the video is about. The temporal distance is limited to 20 for the calculation of the differences between selected key frames, in order to keep the storyline of the video and reduce the computational complexity. Without this limitation, even if a flashback scene or a similar scene is far from the selected key frames, these scenes can be ignored when diverse frames are selected.

Let the indices of the selected key frames be $\mathcal{J}=\{i_k|\alpha_{ij}=1, k=1,2,\ldots,|\mathcal{J}|\}$, then the diversity reward is:

$$R_{div} = \frac{1}{\mathcal{J}(\mathcal{J}-1)} \sum_{t \in \mathcal{J}} \sum_{\substack{t' \in \mathcal{J} \\ t \neq t'}} \left(1 - \frac{x_t^T x_{t'}}{\|x_t\|_2 \|x_{t'}\|_2}\right) \quad \text{Equation (2)}$$

The representativeness reward function $R_{rep}$ Equation (3) calculates the similarity between the selected key frame and all key frames of the video. Through this reward function, the network is trained to predict an importance score for selecting a key frame of a summary representing the video. The summary consisting of key frames allows easy grasping of the subject matter of the video. The present disclosure proposes a new technique of applying an importance score S as the representativeness reward function, as in D×st represented in Equation (3) in order to create a good video summary and improve performance. To train the network, the representativeness reward function needs to be increased, and the distance D Equation (4) in the reward function needs to be minimized.

$$R_{rep} = \exp\left(-\frac{1}{N}\sum_{k=1}^{N} D_t \times s_t\right) \quad \text{Equation (3)}$$

$$D_t = \min_{t' \in \mathcal{J}} \|x_t - x_{t'}\|_2 \quad \text{Equation (4)}$$

Referring to FIG. 6, A is an example in which the distance between a selected key frame and all key frames is long, and B is an example in which the distance between a selected key frame and all key frames is short. If the importance score S of a key frame is high, the key frame may be selected for a summary. On the other hand, if the importance score of a key frame is low, the probability to select the key frame for a summary is low. Both A and B are the average of D×S, and $\overline{A}$ is higher than $\overline{B}$ as shown in FIG. 6. Thus, the reward for A is lower than the reward for B based on the proposed reward function.

There are three cases that explain the effects of a proposed trick using importance scores.

1. If the distance D between key frames is short, the reward function returns a low reward even if the importance score is changed.

2. If the distance D between key frames is long and the importance score S of a key frame is high, the reward function returns a high reward. Also, the network is trained with the low reward, and then the network predicts a score of low importance for the key frame in order to prevent selection.

3. If the distance D between key frames is long and the importance score S of a key frame is low, the reward function returns an intermediate reward. However, most of the key frames will not be selected as a summary because the importance score is low.

Figure 7:
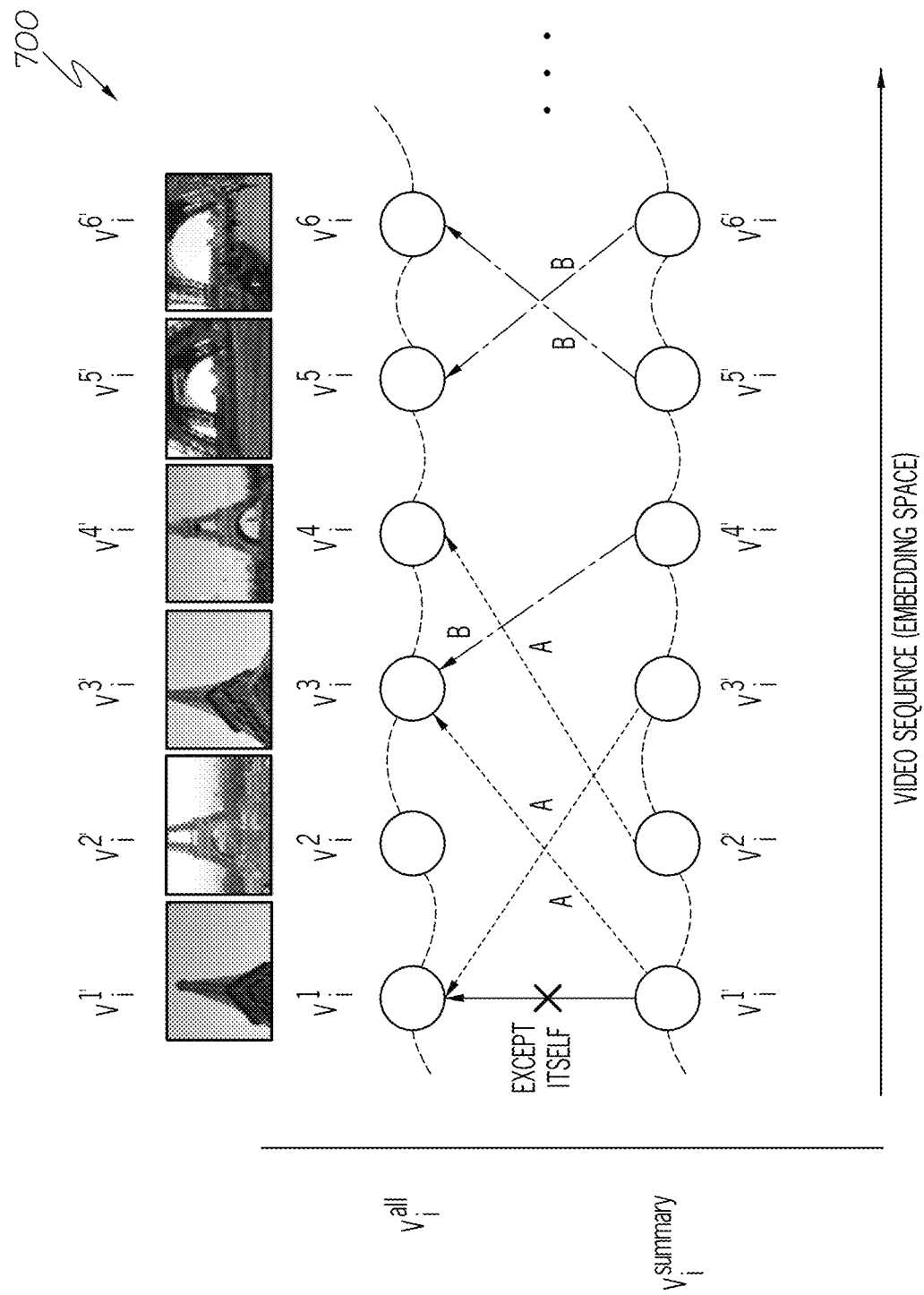
FIG. 7 is a view for explaining a temporal consistency reward function according to an embodiment of the present disclosure.

FIG. 7 is a view for explaining a temporal consistency reward function according to an embodiment of the present disclosure.

A temporal consistency reward function Rcon Equation (6) is proposed to select a representative shot-level key frame efficiently and uniformly. As explained in FIG. 7, the similarity between a selected key frame such as $V_i^{21}$ of $V_i^{summary}$ and other frames of $V_i^{all}$ is calculated, and then the most similar frame $V_i^3$ other than itself is selected.

To explain temporal consistency rewards, such representative key frames as key frames included in B of FIG. 7 are defined as having a similar scene around a neighboring frame. On the other hand, the key frames included in A of FIG. 7 have a similar scene that is temporarily far from a selected key frame. Depending on the storyline intended by the producer, a similar scene to a key frame included in A may appear after a while or may be seen only once. However, one problem with the key frames included A is that a summary made up of these hinders the user's understanding of the video content. Thus, these key frames are to be removed from the summary. Another advantage of removing these key frames is to prevent excessive selection from one side. That is, key frames may be uniformly selected. In the present disclosure, the process of finding the closest neighbor among the key frames $j_k$ selected from all key frames $\{x_t\}_{t=1}^N$ until the number $|\mathcal{J}|$ of all key frames is repeated. In the present disclosure, the temporal consistency of a summary may be learned by minimizing the distance between $i_k$ and $j_k$. To minimize the distance, the reward function is calculated as follows:

$$j_k = \left(\operatorname*{argmin}_{k \in |\mathcal{J}|} \|x_{i_k} - x\|\right) \quad \text{Equation (5)}$$

$$R_{con} = \frac{1}{\log\left(\sum_{k=1}^{\mathcal{J}} (i_k - j_k)^2 / |\mathcal{J}|\right)} \quad \text{Equation (6)}$$

To normalize rewards, the distance is divided by $|\mathcal{J}|$, and log probabilities are used.

To select a key frame as a summary, the Bernoulli distribution is used which is a discrete probability for converting the importance score S into a frame tracking action A={$\alpha_t | \alpha_t \in \{0,1\}$, t=1, ..., N}. If the frame-selection action of a frame is equal to 1, this key frame is selected as a summary. Since the Bernoulli distribution randomly generates variants of frame-selection action, it promotes exploring various summaries of the video.

$$A \sim \text{Bernoulli}(a_t : s_t) = \begin{cases} s_t, & \text{for } a_t = 1 \\ 1 - s_t, & \text{for } a_t = 0 \end{cases} \quad \text{Equation (7)}$$

Also, the quality of a generated summary is evaluated by the sum of rewards. Through this reward, the attention-based video summarization network is trained with a parameterized policy using the policy gradient method. The policy gradient method is one of the reinforcement learning methods for exploring an action strategy to obtain a more efficient summary using a gradient descent method. To avoid a lack of action strategy, the objective function of an exploration strategy for exploring an under-appreciated reward (UREX) method is used [21]. If the log probability $\log \pi_\theta(\alpha_t | h_t)$ of the action $\pi_\theta(\alpha_t | h_t)$, under the policy, underestimates its reward $$r(a_t | h_t) = \frac{R_{rep} + R_{div}}{2} + R_{con},$$

then action will be explored more by the exploration strategy.

To compute the objective function of UREX$o_{UREX}$, the log probability of the action and the reward in $\mathcal{J}$ episodes is maintained. $o_{UREX}$ is an expected value of the reward $R(\alpha_t | h_t)$ which is a sum of RAML (Reward Augmented Maximum Likelihood) objective function. In the present disclosure, to approximate the RAML objective function, the set of normalized importance weights for each episode j is computed using the softmax function:

$$O_{UREX}(\theta; \tau) = \mathbb{E}_{h \sim p(h_t)} \left\{ \sum_{a \in \mathcal{A}} R(a_t | h_t) \right\} \quad \text{Equation (8)}$$

In the present disclosure, the base line is used, which is an important method for policy gradient, to reduce variance and to improve computational efficiency. The baseline is calculated as the moving average of rewards experienced so far. To improve diversity using the moving average of various videos, the baseline is calculated by adding the baseline for each video b1 and the baseline for all videos $b_2$ as follows. Lastly, $L_{rwd}$ is maximized as a cost for training the network.

$$B = 0.7 \times b_1 + 0.3 \times b_2 \quad \text{Equation (9)}$$

$$L_{rwd} = o_{UREX}(\theta; T) - B \quad \text{Equation (10)}$$

In the present disclosure, the regularization term $L_{reg}$ which is proposed in the conventional technology [6] to control the probability to select key frames using importance scores. If most of the importance scores is close to 1 or close to 0, the probability to select wrong key frames as a summary is increased. Accordingly, $L_{reg}$ is used to approximate the importance score to 0.5 during training. The importance score is multiplied by 0.01 to avoid it from converging fast to 0.5.

$$L_{reg} = 0.01 \times \left( \frac{1}{N} \times \sum_{1}^{N} s_t - 0.5 \right)^2 \qquad \text{Equation (11)}$$

After computing all of the loss function, the loss for video summary $L_{summary}$ is finally calculated, and backpropagation is done:

$$L_{summary} = L_{reg} - L_{rwd} \qquad \text{Equation (12)}$$

Algorithm 1 is about the training procedure of the unsupervised video summarization method with the policy gradient method.

| Algorithm 1 Training the Network. |
| --- |
| 1:     Input: $x_c$ frame-level features of the video |
| 2:     Output: proposed network's parameters ($\theta$) |
| 3: |
| 4:     for the number of iterations do |
| 5:        S ← Network($x_t$) % Predict the importance score S |
| 6:        A ← Bernoulli Distribution(S) % Action A from the score S |
| 7:        % Calculate the reward functions and the loss using A and S + |
| 8:        {$\theta$} ← $-\nabla(L_{reg} - L_{rwd})$ % Minimization |
| 9:        % Update the network using the policy gradient method: |
| 10:     end for |

According to the embodiment of the present disclosure, the shot-level importance scores are calculated by averaging the frame-level importance scores within the shot, to test the attention-based video summarization network. For a performance comparison with other methods, the shot-level importance scores of a video are needed. To detect shots, the Kernel Temporal Segmentation (KTS) method is used which detects change points, such as shot boundaries [22]. To generate the video summary, key shots over the top 15% of the video length sorted by the score are selected. This step is the same concept as the '0-1 Knapsack problem for maximizing the importance of a summary video, as described in the conventional technology [6].

The aforementioned apparatus may be implemented in the form of a hardware component, a software component, and/or a combination of a hardware component and a software component. For example, the system and components described in the embodiments may be implemented using one or more general-purpose computers or special-purpose computers, such as a processor, a controller, an arithmetic logic unit (ALU), a digital signal processor, a microcomputer, a field programmable gate array (FPGA), a programmable logic unit (PLU), a microprocessor, or any other device capable of executing or responding to an instruction. A processor may run an operating system (OS) and one or more software applications executed on the OS. Furthermore, the processor may access, store, manipulate, process, and generate data in response to the execution of software. For convenience of understanding, one processing device has been illustrated as being used, but a person having ordinary skill in the art may understand that the processor may include a plurality of processing elements and/or a plurality of types of processing elements. For example, the processor may include a plurality of processors or a single processor and a single controller. Furthermore, a different processing configuration, such as a parallel processor, is also possible.

Software may include a computer program, code, an instruction, or a combination of one or more of these and may configure a processor so that it operates as desired or may instruct the processor independently or collectively. The software and/or data may be embodied in a machine, component, physical device, virtual equipment, computer storage medium or device of any type in order to be interpreted by the processor or to provide an instruction or data to the processor. The software may be distributed to computer systems connected over a network and may be stored or executed in a distributed manner. The software and data may be stored in one or more computer-readable recording media.

The method according to the embodiment may be implemented in the form of a program instruction executable by various computer means and stored in a computer-readable recording medium. The computer-readable recording medium may independently or collectively include program instructions, data files, data structures, and the like. The program instructions recorded in the medium may be specifically designed and configured for the embodiments, or may be known to and used by those of ordinary skill in the computer software art. Examples of the medium include a magnetic medium such as a hard disk, a floppy disk and a magnetic tape, an optical recording medium such as CD-ROM and DVD, a magneto-optical medium such as a floptical disk, and a hardware device such as ROM, RAM, and flash memory, which is specifically configured to store and execute program instructions. Examples of the program instructions may include machine-language code, such as code written by a compiler, and high-level language code executable by a computer using an interpreter.

As described above, although the embodiments have been described in connection with the limited embodiments and the drawings, those skilled in the art may modify and change the embodiments in various ways from the description. For example, the relevant results may be achieved even when the described technologies are performed in a different order than the described methods, and/or even when the described components such as systems, structures, devices, and circuits are coupled or combined in a different form than the described methods or are replaced or substituted by other components or equivalents.

Therefore, other implementations, other embodiments, and equivalents to the claims are also within the scope of the following claims.

References

[1] Ejaz, N.; Mehmood, I.; Baik, S.W. Efficient visual attention based framework for extracting key frames from videos. J. Image Commun. 2013, 28, 34-44.

[2] Gygli, M.; Grabner, H.; Riemenschneider, H.; Gool, L. V. Creating summaries from user videos. In Proceedings of the European Conference on Computer Vision (ECCV)); Springer, 2015, pp. 505-520.

[3] Yoon, U, N.; Hong, M. D.; Jo, G. S. Interp-SUM: Unsupervised Video Summarization with Piecewise Linear Interpolation. Sensors 2021. vol. 21, no. 13, 4562

[4] Apostolidis, E.; Adamantidou, E.; Metsai, A.; Mezaris, V.; Patras, I. Unsupervised Video Summarization via Attention-Driven Adversarial Learning. In International Conference on Multimedia Modeling (MMM); Springer: Daej eon, Korea, 5-8 Jan. 2020, pp. 492-504.
[5] Jung, Y. J.; Cho, D. Y.; Kim, D. H.; Woo, S. H.; Kweon I. S. Discriminative feature learning for unsupervised video summarization. AAAI Conference on Artificial Intelligence, Honolulu, Hawaii, USA, 27 Jan.-1 Feb. 2019, pp. 8537-8544.
[6] Zhou, K.; Qiao, Y.; Xiang, T. Deep Reinforcement Learning for Unsupervised Video Summarization with Diversity-Representativeness Reward. AAAI Conf. Artif. Intell. 2018,32, 7582-7589.
[7] Song, Y.; Vallmitjana, J.; Stent, A.; Jaimes, A. Tvsum: Summarizing web videos using titles. In Proceedings of the IEEE Conference on Computer Vision and Pattern Recognition, Boston, MA, USA, 7-12 Jun. 2015, pp. 5179-5187.
[8] Feng, L.; Li, Z.; Kuang, Z.; Zhang, W. Extractive Video Summarizer with Memory Augmented Neural Networks. MM, Seoul, Republic of Korea, 22-26 Oct. 2018, pp. 976-983.
[9] Zhang, K.; Chao, W. L.; Sha, F.; Grauman, K. Video Summarization with Long Short-term Memory. In Proceedings of the European Conference on Computer Vision (ECCV); Springer: Amsterdam, Netherlands, 2016; pp. 766-782.
[10] Zhang, Y.; Kampffmeyer, M.; Zhao, X.; Tan, M. DTR-GAN: Dilated Temporal Relational Adversarial Network for Video Summarization. In Proceedings of the ACM Turing Celebration Conference (ACM TURC), Shanghai, China, 18 May 2018.
[11] Ji. Z.; Xiong. K.; Pang. Y.; Li. X. Video Summarization with Attention-Based Encoder-Decoder Networks. IEEE Transactions on circuits and systems for video technology, June 2020, vol. 30, no. 6. pp. 1709-1717.
[12] Mahasseni, B.; Lam, M.; Todorovic, S. Unsupervised Video Summarization with Adversarial LSTM Networks. In Proceedings of the IEEE Conference on Computer Vision and Pattern Recognition, Honolulu, Hawaii, USA, 22-25 July 2017, pp. 202-211.
[13] Yuan, L.; Tay, F. E.; Li, P.; Zhou, L.; Feng, F. Cycle-SUM: Cycle-consistent Adversarial LSTM Networks for Unsupervised Video Summarization. In Proceedings of the Thirty-Third AAAI Conference on Artificial Intelligence, Honolulu, Hawaii, USA, 27 Jan.-1 Feb. 2019, Volume 33, pp. 9143-9150.
[14] Kaufman, D.; Levi, G.; Hassner, T.; Wolf, L. Temporal Tessellation: A Unified Approach for Video Analysis. In Proceedings of the IEEE International Conference on Computer Vision (ICCV), 2017, pp. 94-104.
[15] Rochan, M.; Ye, L.; Wang, Y. Video Summarization Using Fully Convolutional Sequence Networks. In Proceedings of the European Conference on Computer Vision (ECCV); Springer: Munich, Germany, 2018, pp. 347-363.
[16] Silver, D.; Lever, G.; Heess, N.; Degris, T.; Wierstra, D.; Riedmiller, M. Deterministic Policy Gradient Algorithms. In Proceedings of the 31st International Conference on International Conference on Machine Learning (ICML), Beijing, China, 21-26 Jun. 2014, pp. 387-395.
[17] Yu, Y. Towards Sample Efficient Reinforcement Learning. In Proceedings of the Twenty-Seventh International Joint Conference on Artificial Intelligence (IJCAI), Stockholm, Sweden, 13-19 July. 2018, pp. 5739-5743.
[18] Lehnert, L.; Laroche, R.; Seijen, H. V. On Value Function Representation of Long Horizon Problems. In Proceedings of the Thirty-Second AAAI Conference on Artificial Intelligence, New Orleans, Louisiana, USA, 2-7 Feb. 2018, pp. 3457-3465.
[19] Szegedy, C.; Liu, W.; Jia, Y.; Sermanet, P.; Reed, S.; Anguelov, D.; Erhan, D.; Vanhoucke, B.; Rabinovich, A. Going deeper with convolutions. In Proceedings of the IEEE Conference on Computer Vision and Pattern Recognition (CVPR), Boston, MA, USA, 7-12 Jun. 2015, pp. 1-9.
[20] Luong. T.; Pham. H.; Manning C. D.; Effective Approaches to Attention-based Neural Machine Translation. Proceedings of the 2015 Conference on Empirical Methods in Natural Language Processing (EMNLP), Lisbon, Portugal, 17-21 Sep. 2015, pp. 1412-1421.
[21] Nachum, O.; Norouzi, M.; Schuurmans, D. Improving Policy Gradient by Exploring Under-Appreciated Rewards. arXiv 2016, arXiv:1611.09321.
[22] Potapov, D.; Douze, M.; Harchaoui, Z.; Schmid, C.; Category-specific video summarization. European Conference on Computer Vision (ECCV), Zurich, Switzerland, September 2014, pp.540-555.
[23] Rochan, M.; Wang, Y. Video Summarization by Learning from Unpaired Data. In Proceedings of the IEEE Conference on Computer Vision and Pattern Recognition (CVPR) 2019, pp. 7902-7911.

The invention claimed is:
1. An attention-based video summarization method comprising:
    extracting frame-level visual features from an input video;
    computing an attention weight and representing an importance score as a frame tracking probability for selecting a key frame by using the attention weight;
    obtaining a temporal consistency reward function and a representativeness reward function so as to select the key frame, based on a visual similarity distance and temporal distance between key frames, and training an attention-based video summarization network to predict an importance score for selecting a key frame of a video summary by using the temporal consistency reward function and the representativeness reward function;
    creating a video summary by selecting a corresponding key frame based on the predicted importance score, evaluating the quality of the created video summary, and performing policy gradient learning for the attention-based video summarization network;
    calculating regularization and reconstruction loss for controlling the probability to select a key frame by using the importance score of the selected key frame; and
    creating a video summary based on the calculated regularization and reconstruction loss.
2. The attention-based video summarization method of claim 1, wherein, the computing of the attention weight and representing the importance score as a frame tracking probability for selecting a key frame by using the attention weight is performed using an encoder network, a decoder network, and an attention layer between the encoder network and the decoder network that reduce parameters and calculations through dilated RNN and extract temporal dependency,
    wherein the encoder network captures visual similarities with local and global context between key frames,
    wherein the attention layer computes an attention weight by using both the output of the encoder network and the last hidden state of the decoder network,
    wherein the attention weight is normalized to a probability score of each key frame by a softmax function, wherein a context vector is obtained by multiplying the output of the encoder network by the attention weight, and wherein the decoder network is trained by connecting the context vector and the previous output of an initialized decoder network for the input of the decoder network, to obtain an importance score by using learning results of the decoder network and the encoder network.

3. The attention-based video summarization method of claim 1, wherein the obtaining of the temporal consistency reward function and the representativeness reward function so as to select the key frame, based on a visual similarity distance and temporal distance between key frames, and trains an attention-based video summarization network to predict an importance score for selecting a key frame of a video summary by using the temporal consistency reward function and the representativeness reward function further includes:

calculating the similarity between the selected key frame and all key frames of the video is calculated by using features extracted using the representative reward function and predicting an importance score for selecting a key frame of a video summary through the representative reward function, and repeating the process of finding the closest neighbor among the selected key frames with respect to all the key frames, in order to select a representative shot-level key frame using the temporal consistency reward function.

4. The attention-based video summarization method of claim 1, wherein the creating of the video summary by selecting the corresponding key frame based on the predicted importance score, evaluating the quality of the created video summary, and performing policy gradient learning for the attention-based video summarization network, further includes:

performing parameterized policy gradient learning by computing a set of normalized importance weights for each episode by using an objective function of an exploration strategy for exploring an under-appreciated reward (UREX) method and a softmax function for approximation of the objective function.

5. An attention-based video summarization apparatus comprising:

a processor; and a memory coupled to the processor, the memory containing instructions, that when executed by the processor:

extracts frame-level visual features from an input video;

computes an attention weight through an attention-based video summarization network and represents an importance score as a frame tracking probability for selecting a key frame by using the attention weight;

obtains a temporal consistency reward function and a representativeness reward function so as to select the key frame, based on a visual similarity distance and temporal distance between key frames, and trains an attention-based video summarization network to predict an importance score for selecting a key frame of a video summary by using the temporal consistency reward function and the representativeness reward function;

creates a video summary by selecting a corresponding key frame based on the predicted importance score, evaluates the quality of the created video summary, and performs policy gradient learning for the attention-based video summarization network, wherein the video summarization network module calculates regularization and reconstruction loss for controlling the probability to select a key frame by using the importance score of the selected key frame; and creates a video summary based on the calculated regularization and reconstruction loss.

6. The attention-based video summarization apparatus of claim 5, further comprising:

an encoder network, a decoder network, and an attention layer between the encoder network and the decoder network that reduce parameters and calculations through dilated RNN and extract temporal dependency, wherein the encoder network captures visual similarities with local and global context between key frames, wherein the attention layer computes an attention weight by using both the output of the encoder network and the last hidden state of the decoder network, wherein the attention weight is normalized to a probability score of each key frame by a softmax function, wherein a context vector is obtained by multiplying the output of the encoder network by the attention weight, and wherein the decoder network is trained by connecting the context vector and the previous output of an initialized decoder network for the input of the decoder network, to obtain an importance score by using learning results of the decoder network and the encoder network.

7. The attention-based video summarization apparatus of claim 5, wherein the similarity between the selected key frame and all key frames of the video is calculated by using features extracted using the representative reward function and an importance score for selecting a key frame of a video summary is predicted through the representative reward function, and is trained to repeat the process of finding the closest neighbor among the selected key frames with respect to all the key frames, in order to select a representative shot-level key frame using the temporal consistency reward function.

8. The attention-based video summarization apparatus of claim 5, wherein the instructions, when executed by the processor, further performs parameterized policy gradient learning by computing a set of normalized importance weights for each episode by using an objective function of an exploration strategy for exploring an under-appreciated reward (UREX) method and a softmax function for approximation of the objective function.

* * * * *